United States Patent
Yamasaki et al.

(10) Patent No.: US 8,012,630 B2
(45) Date of Patent: Sep. 6, 2011

(54) POLYMER GEL ELECTROLYTE SECONDARY CELL

(75) Inventors: Mikiya Yamasaki, Moriguchi (JP); Kentaro Takahashi, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1004 days.

(21) Appl. No.: 11/861,480

(22) Filed: Sep. 26, 2007

(65) Prior Publication Data

US 2008/0081255 A1    Apr. 3, 2008

(30) Foreign Application Priority Data

Sep. 28, 2006  (JP) ................................ 2006-263727
Jun. 28, 2007  (JP) ................................ 2007-170438

(51) Int. Cl.
*H01M 6/14* (2006.01)
*H01M 6/18* (2006.01)

(52) U.S. Cl. ........ 429/300; 429/134; 429/188; 429/309; 429/324; 429/326

(58) Field of Classification Search ........................ None
See application file for complete search history.

(56) References Cited

U.S. PATENT DOCUMENTS

| | | |
|---|---|---|
| 5,952,126 A | 9/1999 | Lee et al. |
| 5,965,300 A | 10/1999 | Lee et al. |
| 6,881,522 B2 | 4/2005 | Hamamoto et al. |
| 2004/0018432 A1 | 1/2004 | Adachi et al. |
| 2004/0110068 A1* | 6/2004 | Seki et al. ............ 429/326 |
| 2005/0084764 A1* | 4/2005 | Lee et al. ............ 429/317 |

FOREIGN PATENT DOCUMENTS

| | | |
|---|---|---|
| EP | 1 054 465 A1 | 11/2000 |
| EP | 1 311 018 A1 | 5/2003 |
| EP | 1 394 886 A1 | 3/2004 |
| JP | 10-116516 A | 5/1998 |
| JP | 10-283839 A | 10/1998 |
| JP | 2003-59529 A | 2/2003 |
| JP | 2003-297422 A | 10/2003 |
| JP | 2004-047449 A | 2/2004 |

(Continued)

OTHER PUBLICATIONS

Machine translation of JP 2004-063385, Kishii et al., Feb. 26, 2004.*

(Continued)

*Primary Examiner* — Barbara L Gilliam
*Assistant Examiner* — Kwang Han
(74) *Attorney, Agent, or Firm* — Westerman, Hattori, Daniels & Adrian, LLP

(57) ABSTRACT

A polymer electrolyte secondary cell that is superior in the cycle characteristic and security during cell overcharge is provided. The polymer electrolyte of the cell includes a non-aqueous solvent, a lithium salt, and a polymer. The non-aqueous solvent contains at least one of ethylene carbonate and propylene carbonate. The volume ratio (25° C., 1 atm) of the ethylene carbonate and the propylene carbonate combined to the non-aqueous solvent is equal to or more than 60%. The polymer is made of a copolymer having a monomer containing N,N-dimethyl acrylamide and a compound with three or more acrylate groups and/or methacrylate groups. The ratio of the compound to the total mass of the monomer is from 10 to 30 mass %. The ratio of the polymer to the polymer electrolyte is from 1.0 to 2.0 mass %.

14 Claims, 2 Drawing Sheets

FOREIGN PATENT DOCUMENTS

| | | |
|---|---|---|
| JP | 2004-63385 A | 2/2004 |
| JP | 2004-063385 A | 2/2004 |
| JP | 2006-32301 A | 2/2006 |
| JP | 2006-278260 A | 10/2006 |
| WO | WO 02/15319 A1 | 2/2002 |

OTHER PUBLICATIONS

European Office Action dated Feb. 17, 2010, issued in corresponding European Patent Application No. 07117010.4.

European Office Action dated Feb. 3, 2009, issued in corresponding European Patent Application No. 07117010.4.

European Office Action, issued May 25, 2010 for corresponding European Patent Application No. 07117010.4.

European Search Report dated Apr. 1, 2008, issued in corresponding to European Application No. 07117010.4.

Chinese Office Action dated Aug. 4, 2010, issued in corresponding Chinese Patent Application No. 200710152792.4.

\* cited by examiner

POLYMER GEL ELECTROLYTE SECONDARY CELL

BACKGROUND OF THE INVENTION

1) Field of the Invention

The present invention relates to an improvement of security of polymer electrolyte secondary cells.

2) Description of the Related Art

In recent years, an increasing need for thin, light-weight cells or batteries with high performance has prompted use of non-aqueous electrolyte secondary cells with polymer electrolytes (also referred to as polymer electrolyte secondary cells). Provided with high energy density and difficulty for solution leakage, polymer electrolyte secondary cells are suitable for the power sources of mobile appliances. However, the polymer electrolyte secondary cells are inferior in electrical characteristics such as a discharge characteristic to usual non-aqueous electrolyte secondary cells with liquid non-aqueous electrolytes.

Here is a possible explanation for the drawback. In the polymer electrolyte, a polymer matrix resulting from polymerization of a polymer precursor (monomer) holds a liquid non-aqueous electrolyte. Since the polymer matrix itself has no ion conductivity, an increase in the polymer in the polymer electrolyte hinders conductivity for lithium ions, resulting in a reduction in discharge characteristic of the cell. Meanwhile, a reduction in the polymer in the polymer electrolyte wanes the capability to hold the liquid non-aqueous electrolyte, resulting in solution leakage.

Thus, prevention of solution leakage and the improvement in discharge characteristic are in a trade-off relationship, making it difficult to secure both of them at the same time.

In addition, the polymer electrolyte uses a flammable organic solvent, which poses a possibility of smoking, fire, and the like when the cell is overcharged. Thus, there is a need for security during overcharge of the cell.

Technologies concerning the non-aqueous electrolyte secondary cell are proposed in Japanese Patent Application Publication No. 2004-63385 (patent document 1), WO02-015319 (patent document 2), Japanese Patent Application Publication No. 2003-297422 (patent document 3), Japanese Patent Application Publication No. 2003-59529 (patent document 4), Japanese Patent Application Publication No. 2004-63385 (patent document 5), Japanese Patent Application Publication No. 2006-278260 (patent document 6), Japanese Patent Application Publication No. 2006-32301 (patent document 7), Japanese Patent Application Publication No. 10-116516 (patent document 8), and Japanese Patent Application Publication No. 10-283839 (patent document 9).

In patent document 1, a polymer formed of alkylene glycol di(meth)acrylate represented by Formula 1 serves as a matrix and holds therein electrolyte salt and a solvent for the electrolyte salt.

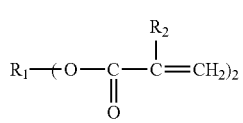

Formula 1 wherein $R_1$ denotes an alkylene group with 2 to 12 carbon atoms, and $R_2$ denotes a hydrogen atom or a methyl group.

This technology, however, requires much polymer; the compound needs to be approximately 0.5 g (approximately 3.2 mass %) relative to 15 g for the electrolytic solution, in order to obtain a preferable polymer electrolyte. This poses the problem of an insufficient discharge characteristic.

In patent document 2, an electrolytic salt containing fluorine and tertiary carboxylic acid ester are contained in a non-aqueous solvent containing cyclic carbonate, in order to obtain a cell with superior cell characteristics such as a cycle characteristic.

This technology, however, is related to a non-aqueous electrolyte secondary cell and therefore cannot be applied as it is to a polymer electrolyte secondary cell.

In patent document 3, carboxylic ester and carboxylate ion are contained in the electrolyte, in order to obtain a cell with superior cell characteristics such as the cycle characteristic.

This technology, however, is related to a non-aqueous electrolyte secondary cell and therefore cannot be applied as it is to a polymer electrolyte secondary cell.

In patent document 4, cyclic carbonate and/or cyclic ester, an alkyne derivative, and tertiary carboxylic ester are contained in a non-aqueous solvent, in order to obtain a cell with superior cell characteristics such as the cycle characteristic.

This technology, however, is related to a non-aqueous electrolyte secondary cell and therefore cannot be applied as it is to a polymer electrolyte secondary cell.

In patent document 5, a cross-linked polymer formed of at least one multi-functional (meth)acrylate selected from multi-functional (meth)acrylate represented by Formula 2 and multi-functional (meth)acrylate represented by Formula 3 serves as a polymer matrix and holds therein electrolytic salt and a solvent for the electrolytic salt, thereby forming a gel electrolyte with high performance.

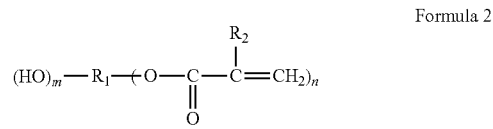

Formula 2

(I)

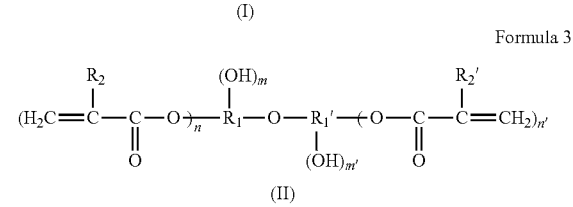

Formula 3

(II)

This technology, however, requires much polymer; the compound needs to be approximately 0.5 g (approximately 3.2 mass %) relative to 15 g for the electrolytic solution, in order to obtain a preferable polymer electrolyte. This poses the problem of insufficient discharge characteristic.

In patent document 6, a non-aqueous electrolytic solution contains a halogen-substituted organic compound and a polymerizable monomer such as a vinyl monomer, in order to obtain a cell with enhanced security in case of thermal runaway of the cell.

This technology, however, is related to a non-aqueous electrolyte secondary cell and therefore cannot be applied as it is to a polymer electrolyte secondary cell.

In patent document 7, the electrolyte contains a solvent containing at least one selected from the group consisting of carboxylic acid represented by Formula 4 and ketone represented by Formula 5, in order to obtain a cell with a superior cycle characteristic.

Formula 4

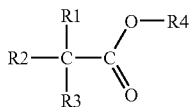

Formula 5

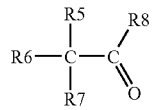

This technology still provides an insufficient discharge characteristic.

Patent document 8 is related to a cell with a polymer solid electrolyte containing: a polymer matrix formed by copolymerization of a polymerizable monomer represented by Structural Formula (I) and a cross-linking agent represented by Structural Formula (II); a polymerization initiator; and an electrolytic solution made of an inorganic salt and a solvent, in order to obtain a solid electrolyte secondary cell superior in ion conductivity.

Formula 6

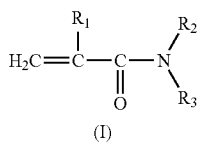

Formula 7

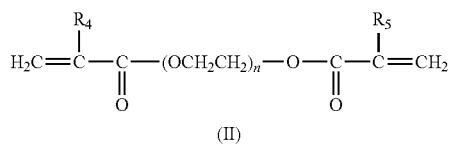

This technology, however, requires much polymer; the compound needs to be approximately 4 g (approximately 20 mass %) relative to 15.8 g for the electrolytic solution, in order to obtain a preferable polymer electrolyte. This poses the problem of an insufficient discharge characteristic.

Patent document 9 is related to a polymer solid electrolyte having vinylidene fluoride resin and/or N,N-diethyl acrylamide contained in a polymer electrolyte solvent containing: a polymer matrix formed by copolymerization of a polymerizable monomer represented by Structural Formula (1) and a cross-linking agent represented by Structural Formula (2); a polymerization initiator; and an electrolytic solution made of an inorganic salt and a solvent, in order to obtain a solid electrolyte secondary cell superior in ion conductivity and mechanical strength, Formula 8

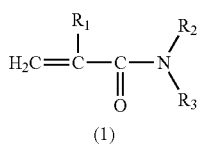

Formula 9

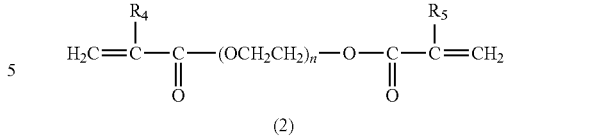

This technology still provides an insufficient discharge characteristic.

SUMMARY OF THE INVENTION

The present invention has been accomplished in view of the above inconveniences, and it is an object of the present invention to improve the discharge characteristic of a polymer electrolyte secondary cell.

According to a first aspect of the present invention, a polymer electrolyte secondary cell includes: a positive electrode; a negative electrode; a polymer electrolyte containing a non-aqueous solvent, a polymer, and a lithium salt; and a cell case for accommodating the positive electrode, the negative electrode, and the polymer electrolyte. The non-aqueous solvent contains at least one of ethylene carbonate and propylene carbonate. The volume ratio (25° C., 1 atm) of the ethylene carbonate and the propylene carbonate combined to the non-aqueous solvent is equal to or more than 60%. The polymer comprises a copolymer having a monomer containing N,N-dimethyl acrylamide and a compound with three or more acrylate groups and/or methacrylate groups. The ratio of the compound to the total mass of the monomer is from 10 to 30 mass %. The ratio of the polymer to the polymer electrolyte is from 1.0 to 2.0 mass %.

In this structure, the polymer comprises a copolymer containing N,N-dimethyl acrylamide and a compound with three or more acrylate groups and/or methacrylate groups, and the ratio of the compound to the total mass of the monomer is restricted within the range of from 10 to 30 mass %. This results in a high-quality polymer matrix that eliminates the possibility of solution leakage even when the polymer constitutes as small as 1.0 to 2.0 mass % of the polymer electrolyte. For the non-aqueous solvent held by the polymer, ethylene carbonate (EC) and propylene carbonate (PC) constitute equal to or more than 60 volume % (25° C., 1 atm) of the solvent. This results in a polymer with sufficient performance for holding the electrolytic solution. Although the reason for the effectiveness of the claimed percentage is not still known, it is believed to be related to the high relative permittivity of EC and PC.

The limitation "three or more acrylate groups and/or methacrylate groups", as used herein, means that the total number of the acrylate groups and the methacrylate groups is equal to or more than three.

The upper limit for the total mass ratio of the ethylene carbonate (EC) and the propylene carbonate (PC) to the solvent is 100 volume %(25° C., 1 atm).

According to a second aspect of the present invention, a polymer electrolyte secondary cell includes: a positive electrode; a negative electrode; a polymer electrolyte containing a non-aqueous solvent, a polymer, and a lithium salt; and a cell case for accommodating the positive electrode, the negative electrode, and the polymer electrolyte. The non-aqueous solvent contains at least one of ethylene carbonate and propylene carbonate. The volume ratio (25° C., 1 atm) of the ethylene carbonate and the propylene carbonate combined to the non-aqueous solvent is equal to or more than 60%. The polymer comprises a copolymer having a monomer containing N,N-dimethyl acrylamide, a compound with three or more acrylate groups and/or methacrylate groups, and tertiary vinyl carboxylate. The ratio of the compound to the total mass of the monomer is from 10 to 30 mass %. The ratio of the polymer to the polymer electrolyte is from 1.0 to 2.0 mass %.

This structure provides advantageous effects equivalent to those by the first aspect of the present invention. Further, the tertiary vinyl carboxylate contained in the monomer reacts with the negative electrode to form a high-quality coating that inhibits reaction between the negative electrode and the polymer electrolyte. This enhances security in case of overcharge of the cell. Thus, this structure provides a cell also superior in security during overcharge of the cell.

As the tertiary vinyl carboxylate, a compound represented by Formula 10 may be used. In particular, vinyl pivalate (where R1, R2, and R3 are all methyl compounds) is preferred for its efficiency for the effect per unit mass.

Formula 10

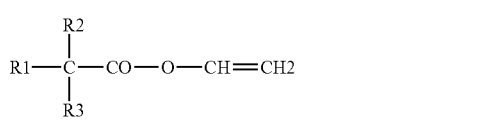

wherein R1, R2, and R3 independently denote an alkyl group with equal to or less than ten carbon atoms, preferably an alkyl group with equal to or less than eight carbon atoms, more preferably an alkyl group with equal to or less than five carbon atoms, further more preferably an alkyl group with equal to or less than three carbon atoms.

If the mass ratio of the tertiary vinyl carboxylate to the total mass of the monomer is excessively small, the advantageous effect provided by the tertiary vinyl carboxylate Cannot be obtained sufficiently. If, on the other hand, the mass ratio of the tertiary vinyl carboxylate is excessively large, a high-quality polymer network cannot be formed, resulting in deteriorated performance for holding the non-aqueous electrolytic solution. In view of this, the mass ratio of the tertiary vinyl carboxylate to the total mass of the monomer is preferably from 10 to 50%.

In the first or second aspect of the present invention, the non-aqueous solvent may contain propylene carbonate, and the polymer electrolyte may further contain succinic anhydride.

In view of improving the discharge characteristic, the non-aqueous solvent preferably contains propylene carbonate (PC). However, propylene carbonate has the disadvantage of reacting with the negative electrode and thus being decomposed. Succinic anhydride functions to inhibit the decomposition of the propylene carbonate at the negative electrode. When, therefore, propylene carbonate is contained in the non-aqueous solvent, succinic anhydride is preferably contained, too. More preferably, the content of the succinic anhydride is from 0.01 to 10.00 mass %, further more preferably from 0.05 to 5.00 mass %.

In the first or second aspect of the present invention, the polymer may be formed by inner cell polymerization.

The inner cell polymerization facilitates fabrication of the polymer electrolyte.

In the first or second aspect of the present invention, the cell case may be made of an aluminum laminate film.

Use of a cell case made of an aluminum laminate film makes the cell thinner and smaller.

According to the first aspect of the present invention, a polymer electrolyte secondary cell that eliminates the possibility of solution leakage and has a superior discharge characteristic is realized. According to the second aspect of the present invention, a polymer electrolyte secondary cell that eliminates the possibility of solution leakage and has a superior discharge characteristic and enhanced security during overcharge is realized.

Figure 1:
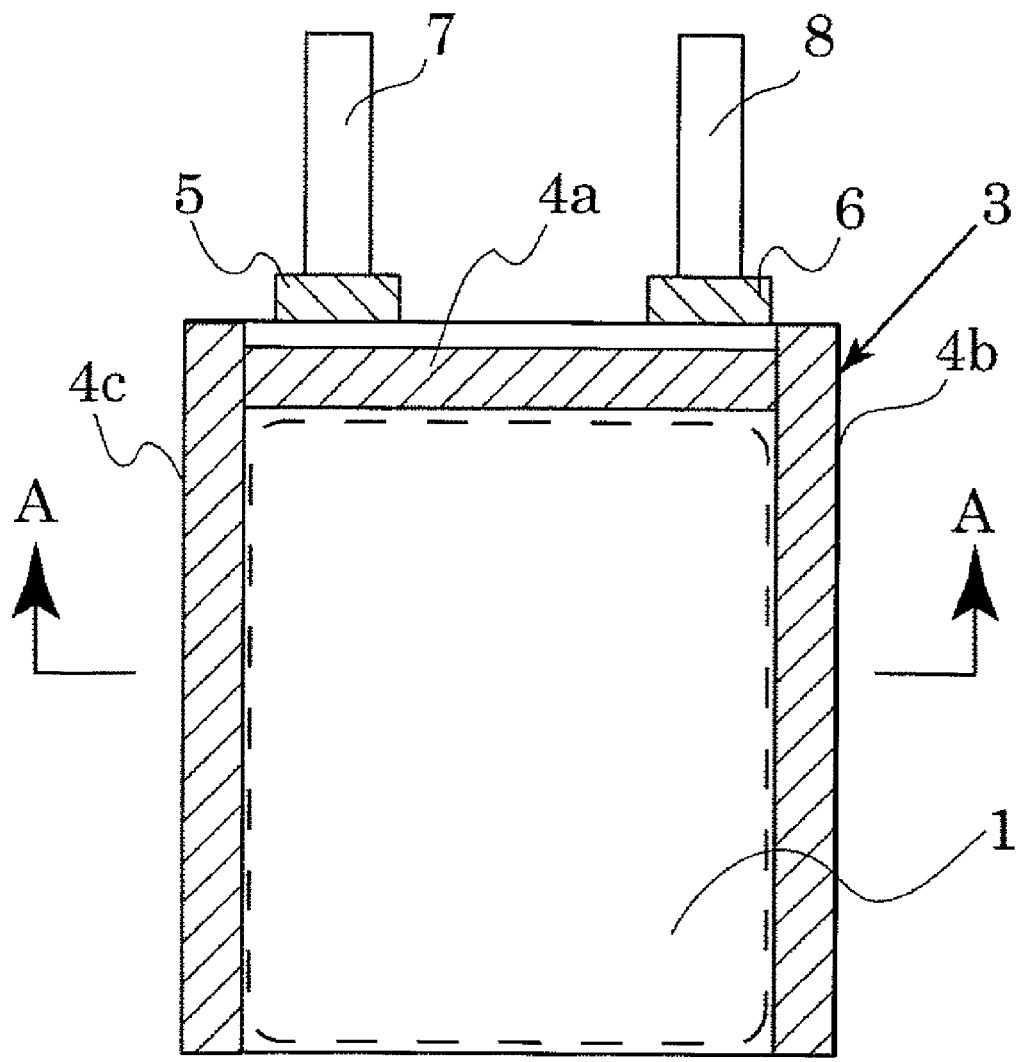
FIG. 1 is a frontal perspective view of a cell with a film cell case according to the present invention.

REFERENCE MARKS IN THE DRAWINGS 1 electrode assembly
2 storage space
3 film cell case
4a, 4b, 4c sealed portions
5 positive electrode tab film
6 negative electrode tab film
7 positive electrode lead
8 negative electrode lead
9 positive electrode
10 negative electrode
11 separator

DESCRIPTION OF PREFERRED EMBODIMENT

The first aspect of the present invention will be described in detail with reference to the drawings.

Embodiment 1

Figure 2:
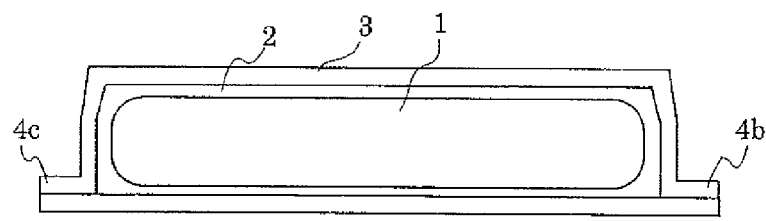
FIG. 2 is a sectional view of the cell taken along the line A-A shown in FIG. 1.
Figure 3:
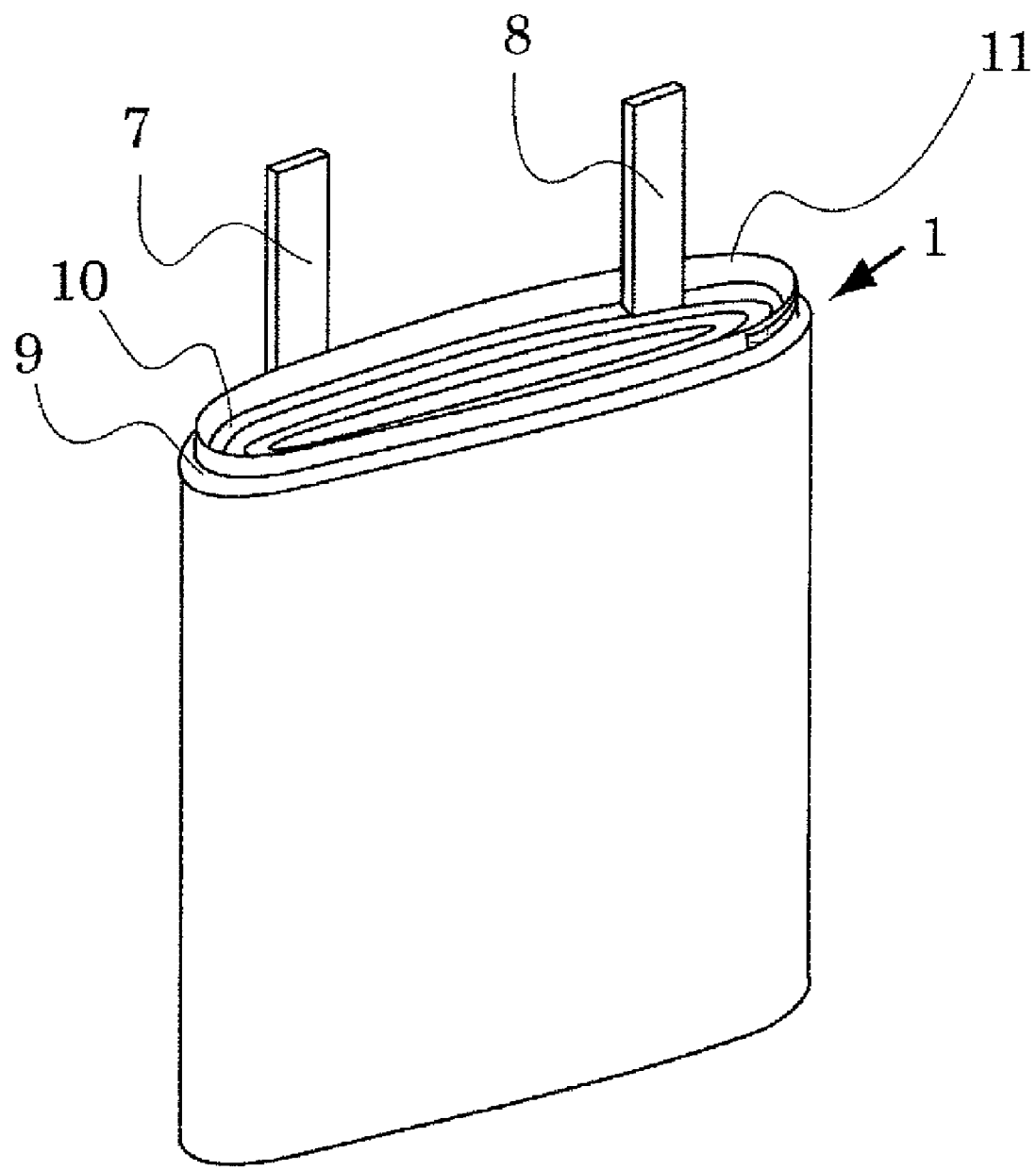
FIG. 3 is a perspective view of a flat electrode assembly used in the present invention.

FIG. 1 is a frontal perspective view of a cell with a film outer casing according to this embodiment the present invention. FIG. 2 is a sectional view of the cell taken along the line A-A shown in FIG. 1. FIG. 3 is a perspective view of a flat electrode assembly used in the polymer electrolyte cell of the present invention.

Referring to FIG. 2, the polymer electrolyte cell according to the present invention has an electrode assembly 1, which is disposed in a storage space 2. Referring to FIG. 1, the storage space 2 is formed by sealing the upper edge, lower edge, and middle portion of the laminate outer casing 3 respectively at sealed portions 4a, 4b, and 4c. Also the storage space 2 accommodates a polymer electrolyte made of a non-aqueous electrolyte containing a non-aqueous solvent and an electrolyte salt, which is held in a polymer matrix and gelled. Referring to FIG. 3, the electrode assembly 1 has a positive electrode 9, a negative electrode 10, and a separator 11 separating the electrodes from one another, which are wound into a flat form.

The positive electrode 9 and the negative electrode 10 are respectively connected to a positive electrode lead made of aluminum and a negative electrode lead 8 made of copper, so that chemical energy generated inside the cell is extracted outside as electrical energy. The electrode leads are respectively attached with tab films 5 and 6.

The laminate cell case 3 is of a structure with a lamination of a nylon layer, an aluminum film, and a non-extended polypropylene layer.

It is noted that in the present invention the cell is not limited to the above one using an aluminum laminate material.

The polymer electrolyte has, as its polymer matrix, a copolymer of N,N-dimethyl acrylamide and a compound with three or more acrylate groups and/or methacrylate groups. The polymer matrix holds therein, in the form of a gel, a non-aqueous solvent containing ethylene carbonate and propylene carbonate at a volume ratio (25° C., 1 atm) of equal to or more than 60%, and an electrolytic salt dissolved in the non-aqueous solvent.

(Method for Producing the Cell)

<Preparation of the Positive Electrode>

Ninety-two mass parts of a positive electrode active material made of a lithium cobalt oxide ($LiCoO_2$), 5 mass parts of a conducting agent made of acetylene black, 3 mass parts of a binding agent made of polyvinylidene fluoride (PVDF), and N-Methyl-2-Pyrrolidone (NMP) were mixed together, thus preparing a positive electrode active material slurry.

Next, the positive electrode active material slurry was applied to both surfaces of a positive electrode core made of an aluminum foil of 20 μm thick with a doctor blade so that the thickness would be uniform. Then, this electrode plate was passed through a heated drier to be dried, thereby removing the non-aqueous solvent that was used during slurry preparation. After dried, the electrode plate was extended in a roll presser to a thickness of 0.17 mm, thus obtaining the positive electrode 9.

<Preparation of the Negative Electrode>

Ninety-five mass parts of a negative electrode active material made of graphite, 3 mass parts of a thickener made of carboxymethyl cellulose (CMC), 2 mass parts of a binding agent made of styrene-butadiene rubber (SBR), and water were mixed together, thus preparing a negative electrode active material slurry. The negative electrode active material slurry was applied to both surfaces of a negative electrode core made of a copper foil (20 μm thick) with a doctor blade so that the thickness would be uniform. Then, this electrode plate was passed through a drier to remove the moisture that was used during the slurry preparation. After dried, the electrode plate was extended in a roll presser to a thickness of 0.14 mm, thus obtaining the negative electrode 10.

<Preparation of the Prepolymer Electrolyte>

In a mixture solvent of ethylene carbonate (EC), propylene carbonate (PC), diethyl carbonate (DEC), and ethyl methyl carbonate (EMC), $LiPF_6$ as the electrolyte salt was dissolved at a rate of 1.1 (mol/liter), thus obtaining an electrolytic solution. To this electrolytic solution, 0.5 mass parts of succinic anhydride was added. To this mixture solution were added: trimethylolpropane triacrylate (TMPTA) represented by Formula 11; tetramethylolmethane tetraacrylate (TMMTA) represented by Formula 12; N,N-dimethyl acrylamide (DMAA) represented by Formula 13; methoxytriethyleneglycol acrylate (METGA) represented by Formula 14; and 3000 ppm of tert-butyl peroxypivalate as a polymerization initiator. Thus a prepolymer electrolyte was obtained.

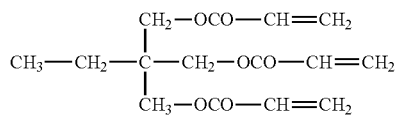

Formula 11

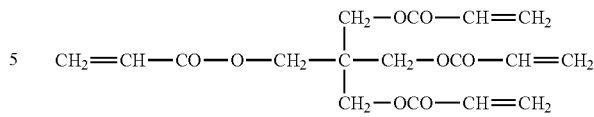

Formula 12

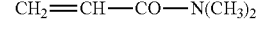

Formula 13

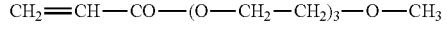

Formula 14

<Preparation of the Electrode Assembly>

To the positive and negative electrodes thus prepared, the positive and negative leads 7 and 8 were respectively attached. Then the electrodes were superposed onto one another with a separator made of a polyethylene porous film (0.025 mm thick) disposed between the electrodes, in such a manner that the center line in the width direction of the electrodes would agree to one another. Then the resulting product was wound using a winder and taped at the outermost surface, thus completing the flat electrode assembly 1.

<Assembly of the Cell>

A laminate film was molded into a cup form (concave form) to form the storage space 2, into which the flat electrode assembly 1 was inserted. Then the film was folded to form the bottom. Both side edges of the film, which communicated with the bottom, were heat-fused by a rectangular box-type mold at 200° C. for 3.0 seconds to form the side sealed portions 4b and 4c. Through the opening portion from which the tab was protruding, the prepolymer electrolyte was injected, which was then left standing in an oven for 3 hours at 50° C. to allow the prepolymer to polymerize. After depressurization, charging, and sealing of the opening portion, the polymer electrolyte secondary cell according to this embodiment was completed.

The present invention will be described in further detail with reference to examples.

(First Example Group)

Cells according to examples 1 to 46 and comparative examples 1 to 166 were prepared in the same manner as in the embodiment 1. Tables 1 to 15 below list, for each of the examples, the kind of the non-aqueous solvent and its volume ratio (25° C., 1 atm), the mass ratio of the monomer (which is defined as the mass ratio of the monomer to the monomer, solvent, electrolytic salt, and succinic anhydride, which are assumed to be 100 mass parts, which ratio is taken as the polymer mass ratio), and the mass percentage of the succinic anhydride (which is defined as the mass ratio of the succinic anhydride to the monomer, solvent, electrolytic salt, and succinic anhydride, which are assumed to be 100 mass parts).

[Estimation of Curability of the Polymer]

In a 200 ml plastic container, 100 ml of the prepolymer electrolyte was placed to allow it to polymerize. After polymerization, the plastic container was tilted by 90 degrees. The case where the solution surface collapsed was estimated as NG, while the case of no collapse was estimated as OK. The results are shown in Tables 1 to 15.

[Measurement of Capacity]

The theoretical capacity of the cells according to the examples and comparative examples is 800 mAh. Ten cells from each of the examples and comparative examples were prepared and subjected to this test.

Charging Conditions: Each cell was charged at a constant current of 1 It (800 mA) to a voltage of 4.2 V, and then at a constant voltage of 4.2 V to 40 mA.

Discharging Conditions: Each cell was discharged at a constant current of 1 It (800 mA) to a voltage of 2.75 V.

Estimation: The case where the discharge capacity was less than 95% of the theoretical capacity was estimated as NG, while the case of equal to or more than 95% of the theoretical capacity was estimated as OK. The number of NGs in the ten samples is listed in Tables 1 to 15.

TABLE 1

| | Monomer mass % | Monomer (mass %) | | | | Solvent (volume %) | | | Succinic anhydride (mass %) | Curability | Capacity |
|---|---|---|---|---|---|---|---|---|---|---|---|
| | | TMPTA | TMMTA | DMAA | MTEGA | EC | PC | DEC | | | |
| Com. Ex. 1 | 0.8 | 20 | — | 80 | — | 50 | 50 | — | 0.5 | NG | 0 |
| Com. Ex. 2 | 0.8 | 20 | — | 80 | — | 30 | 30 | 40 | 0.5 | NG | 0 |
| Com. Ex. 3 | 0.8 | 20 | — | 80 | — | 25 | 25 | 50 | 0.5 | NG | 0 |
| Ex. 1 | 1.0 | 20 | — | 80 | — | 50 | 50 | — | 0.5 | OK | 0 |
| Ex. 2 | 1.0 | 20 | — | 80 | — | 30 | 30 | 40 | 0.5 | OK | 0 |
| Com. Ex. 4 | 1.0 | 20 | — | 80 | — | 25 | 25 | 50 | 0.5 | NG | 0 |
| Ex. 3 | 2.0 | 20 | — | 80 | — | 50 | 50 | — | 0.5 | OK | 0 |
| Ex. 4 | 2.0 | 20 | — | 80 | — | 30 | 30 | 40 | 0.5 | OK | 0 |
| Com. Ex. 5 | 2.0 | 20 | — | 80 | — | 25 | 25 | 50 | 0.5 | NG | 0 |
| Com. Ex. 6 | 3.0 | 20 | — | 80 | — | 50 | 50 | — | 0.5 | OK | 2 |
| Com. Ex. 7 | 3.0 | 20 | — | 80 | — | 30 | 30 | 40 | 0.5 | OK | 2 |
| Com. Ex. 8 | 3.0 | 20 | — | 80 | — | 25 | 25 | 50 | 0.5 | NG | 2 |

TABLE 2

| | Monomer mass % | Monomer (mass %) | | | | Solvent (volume %) | | | Succinic anhydride (mass %) | Curability | Capacity |
|---|---|---|---|---|---|---|---|---|---|---|---|
| | | TMPTA | TMMTA | DMAA | MTEGA | EC | PC | DEC | | | |
| Com. Ex. 9 | 0.8 | 10 | — | 90 | — | 50 | 50 | — | 0.5 | NG | 0 |
| Com. Ex. 10 | 0.8 | 10 | — | 90 | — | 30 | 30 | 40 | 0.5 | NG | 0 |
| Com. Ex. 11 | 0.8 | 10 | — | 90 | — | 25 | 25 | 50 | 0.5 | NG | 0 |
| Ex. 5 | 1.0 | 10 | — | 90 | — | 50 | 50 | — | 0.5 | OK | 0 |
| Ex. 6 | 1.0 | 10 | — | 90 | — | 30 | 30 | 40 | 0.5 | OK | 0 |
| Com. Ex. 12 | 1.0 | 10 | — | 90 | — | 25 | 25 | 50 | 0.5 | NG | 0 |
| Ex. 7 | 2.0 | 10 | — | 90 | — | 50 | 50 | — | 0.5 | OK | 0 |
| Ex. 8 | 2.0 | 10 | — | 90 | — | 30 | 30 | 40 | 0.5 | OK | 0 |
| Com. Ex. 13 | 2.0 | 10 | — | 90 | — | 25 | 25 | 50 | 0.5 | NG | 0 |
| Com. Ex. 14 | 3.0 | 10 | — | 90 | — | 50 | 50 | — | 0.5 | OK | 2 |
| Com. Ex. 15 | 3.0 | 10 | — | 90 | — | 30 | 30 | 40 | 0.5 | OK | 2 |
| Com. Ex. 16 | 3.0 | 10 | — | 90 | — | 25 | 25 | 50 | 0.5 | NG | 2 |

TABLE 3

| | Monomer mass % | Monomer (mass %) | | | | Solvent (volume %) | | | Succinic anhydride (mass %) | Curability | Capacity |
|---|---|---|---|---|---|---|---|---|---|---|---|
| | | TMPTA | TMMTA | DMAA | MTEGA | EC | PC | DEC | | | |
| Com. Ex. 17 | 0.8 | 30 | — | 70 | — | 50 | 50 | — | 0.5 | NG | 0 |
| Com. Ex. 18 | 0.8 | 30 | — | 70 | — | 30 | 30 | 40 | 0.5 | NG | 0 |
| Com. Ex. 19 | 0.8 | 30 | — | 70 | — | 25 | 25 | 50 | 0.5 | NG | 0 |
| Ex. 9 | 1.0 | 30 | — | 70 | — | 50 | 50 | — | 0.5 | OK | 0 |
| Ex. 10 | 1.0 | 30 | — | 70 | — | 30 | 30 | 40 | 0.5 | OK | 0 |
| Com. Ex. 20 | 1.0 | 30 | — | 70 | — | 25 | 25 | 50 | 0.5 | NG | 0 |
| Ex. 11 | 2.0 | 30 | — | 70 | — | 50 | 50 | — | 0.5 | OK | 0 |
| Ex. 12 | 2.0 | 30 | — | 70 | — | 30 | 30 | 40 | 0.5 | OK | 0 |
| Com. Ex. 21 | 2.0 | 30 | — | 70 | — | 25 | 25 | 50 | 0.5 | NG | 0 |

TABLE 3-continued

|  | Monomer mass % | Monomer (mass %) | | | | Solvent (volume %) | | | Succinic anhydride (mass %) | Curability | Capacity |
|---|---|---|---|---|---|---|---|---|---|---|---|
|  |  | TMPTA | TMMTA | DMAA | MTEGA | EC | PC | DEC |  |  |  |
| Com. Ex. 22 | 3.0 | 30 | — | 70 | — | 50 | 50 | — | 0.5 | OK | 2 |
| Com. Ex. 23 | 3.0 | 30 | — | 70 | — | 30 | 30 | 40 | 0.5 | OK | 2 |
| Com. Ex. 24 | 3.0 | 30 | — | 70 | — | 25 | 25 | 50 | 0.5 | NG | 2 |

TABLE 4

|  | Monomer mass % | Monomer (mass %) | | | | Solvent (volume %) | | | Succinic anhydride (mass %) | Curability | Capacity |
|---|---|---|---|---|---|---|---|---|---|---|---|
|  |  | TMPTA | TMMTA | DMAA | MTEGA | EC | PC | DEC |  |  |  |
| Com. Ex. 25 | 0.8 | 40 | — | 60 | — | 50 | 50 | — | 0.5 | NG | 0 |
| Com. Ex. 26 | 0.8 | 40 | — | 60 | — | 30 | 30 | 40 | 0.5 | NG | 0 |
| Com. Ex. 27 | 0.8 | 40 | — | 60 | — | 25 | 25 | 50 | 0.5 | NG | 0 |
| Com. Ex. 28 | 1.0 | 40 | — | 60 | — | 50 | 50 | — | 0.5 | NG | 0 |
| Com. Ex. 29 | 1.0 | 40 | — | 60 | — | 30 | 30 | 40 | 0.5 | NG | 0 |
| Com. Ex. 30 | 1.0 | 40 | — | 60 | — | 25 | 25 | 50 | 0.5 | NG | 0 |
| Com. Ex. 31 | 2.0 | 40 | — | 60 | — | 50 | 50 | — | 0.5 | NG | 0 |
| Com. Ex. 32 | 2.0 | 40 | — | 60 | — | 30 | 30 | 40 | 0.5 | NG | 0 |
| Com. Ex. 33 | 2.0 | 40 | — | 60 | — | 25 | 25 | 50 | 0.5 | NG | 0 |
| Com. Ex. 34 | 3.0 | 40 | — | 60 | — | 50 | 50 | — | 0.5 | NG | 3 |
| Com. Ex. 35 | 3.0 | 40 | — | 60 | — | 30 | 30 | 40 | 0.5 | NG | 2 |
| Com. Ex. 36 | 3.0 | 40 | — | 60 | — | 25 | 25 | 50 | 0.5 | NG | 2 |

TABLE 5

|  | Monomer mass % | Monomer (mass %) | | | | Solvent (volume %) | | | Succinic anhydride (mass %) | Curability | Capacity |
|---|---|---|---|---|---|---|---|---|---|---|---|
|  |  | TMPTA | TMMTA | DMAA | MTEGA | EC | PC | DEC |  |  |  |
| Com. Ex. 37 | 0.8 | — | — | 100 | — | 50 | 50 | — | 0.5 | NG | 0 |
| Com. Ex. 38 | 0.8 | — | — | 100 | — | 30 | 30 | 40 | 0.5 | NG | 0 |
| Com. Ex. 39 | 0.8 | — | — | 100 | — | 25 | 25 | 50 | 0.5 | NG | 0 |
| Com. Ex. 40 | 1.0 | — | — | 100 | — | 50 | 50 | — | 0.5 | NG | 0 |
| Com. Ex. 41 | 1.0 | — | — | 100 | — | 30 | 30 | 40 | 0.5 | NG | 0 |
| Com. Ex. 42 | 1.0 | — | — | 100 | — | 25 | 25 | 50 | 0.5 | NG | 0 |
| Com. Ex. 43 | 2.0 | — | — | 100 | — | 50 | 50 | — | 0.5 | NG | 0 |
| Com. Ex. 44 | 2.0 | — | — | 100 | — | 30 | 30 | 40 | 0.5 | NG | 0 |
| Com. Ex. 45 | 2.0 | — | — | 100 | — | 25 | 25 | 50 | 0.5 | NG | 0 |
| Com. Ex. 46 | 3.0 | — | — | 100 | — | 50 | 50 | — | 0.5 | OK | 3 |
| Com. | 3.0 | — | — | 100 | — | 30 | 30 | 40 | 0.5 | OK | 3 |

TABLE 5-continued

| | Monomer mass % | Monomer (mass %) | | | | Solvent (volume %) | | | Succinic anhydride (mass %) | Curability | Capacity |
|---|---|---|---|---|---|---|---|---|---|---|---|
| | | TMPTA | TMMTA | DMAA | MTEGA | EC | PC | DEC | | | |
| Ex. 47 Com. Ex. 48 | 3.0 | — | — | 100 | — | 25 | 25 | 50 | 0.5 | NG | 2 |

TABLE 6

| | Monomer mass % | Monomer (mass %) | | | | Solvent (volume %) | | | Succinic anhydride (mass %) | Curability | Capacity |
|---|---|---|---|---|---|---|---|---|---|---|---|
| | | TMPTA | TMMTA | DMAA | MTEGA | EC | PC | DEC | | | |
| Com. Ex. 49 | 0.8 | — | 20 | 80 | — | 50 | 50 | — | 0.5 | NG | 0 |
| Com. Ex. 50 | 0.8 | — | 20 | 80 | — | 30 | 30 | 40 | 0.5 | NG | 0 |
| Com. Ex. 51 | 0.8 | — | 20 | 80 | — | 25 | 25 | 50 | 0.5 | NG | 0 |
| Ex. 13 | 1.0 | — | 20 | 80 | — | 50 | 50 | — | 0.5 | OK | 0 |
| Ex. 14 | 1.0 | — | 20 | 80 | — | 30 | 30 | 40 | 0.5 | OK | 0 |
| Com. Ex. 52 | 1.0 | — | 20 | 80 | — | 25 | 25 | 50 | 0.5 | NG | 0 |
| Ex. 15 | 2.0 | — | 20 | 80 | — | 50 | 50 | — | 0.5 | OK | 0 |
| Ex. 16 | 2.0 | — | 20 | 80 | — | 30 | 30 | 40 | 0.5 | OK | 0 |
| Com. Ex. 53 | 2.0 | — | 20 | 80 | — | 25 | 25 | 50 | 0.5 | NG | 0 |
| Com. Ex. 54 | 3.0 | — | 20 | 80 | — | 50 | 50 | — | 0.5 | OK | 3 |
| Com. Ex. 55 | 3.0 | — | 20 | 80 | — | 30 | 30 | 40 | 0.5 | OK | 3 |
| Com. Ex. 56 | 3.0 | — | 20 | 80 | — | 25 | 25 | 50 | 0.5 | NG | 2 |

TABLE 7

| | Monomer mass % | Monomer (mass %) | | | | Solvent (volume %) | | | Succinic anhydride (mass %) | Curability | Capacity |
|---|---|---|---|---|---|---|---|---|---|---|---|
| | | TMPTA | TMMTA | DMAA | MTEGA | EC | PC | DEC | | | |
| Com. Ex. 57 | 0.8 | — | 10 | 90 | — | 50 | 50 | — | 0.5 | NG | 0 |
| Com. Ex. 58 | 0.8 | — | 10 | 90 | — | 30 | 30 | 40 | 0.5 | NG | 0 |
| Com. Ex. 59 | 0.8 | — | 10 | 90 | — | 25 | 25 | 50 | 0.5 | NG | 0 |
| Ex. 17 | 1.0 | — | 10 | 90 | — | 50 | 50 | — | 0.5 | OK | 0 |
| Ex. 18 | 1.0 | — | 10 | 90 | — | 30 | 30 | 40 | 0.5 | OK | 0 |
| Com. Ex. 60 | 1.0 | — | 10 | 90 | — | 25 | 25 | 50 | 0.5 | NG | 0 |
| Ex. 19 | 2.0 | — | 10 | 90 | — | 50 | 50 | — | 0.5 | OK | 0 |
| Ex. 20 | 2.0 | — | 10 | 90 | — | 30 | 30 | 40 | 0.5 | OK | 0 |
| Com. Ex. 61 | 2.0 | — | 10 | 90 | — | 25 | 25 | 50 | 0.5 | NG | 0 |
| Com. Ex. 62 | 3.0 | — | 10 | 90 | — | 50 | 50 | — | 0.5 | OK | 3 |
| Com. Ex. 63 | 3.0 | — | 10 | 90 | — | 30 | 30 | 40 | 0.5 | OK | 2 |
| Com. Ex. 64 | 3.0 | — | 10 | 90 | — | 25 | 25 | 50 | 0.5 | NG | 2 |

TABLE 8

| | Monomer mass % | Monomer (mass %) | | | | Solvent (volume %) | | | Succinic anhydride (mass %) | Curability | Capacity |
|---|---|---|---|---|---|---|---|---|---|---|---|
| | | TMPTA | TMMTA | DMAA | MTEGA | EC | PC | DEC | | | |
| Com. Ex. 65 | 0.8 | — | 30 | 70 | — | 50 | 50 | — | 0.5 | NG | 0 |
| Com. Ex. 66 | 0.8 | — | 30 | 70 | — | 30 | 30 | 40 | 0.5 | NG | 0 |
| Com. Ex. 67 | 0.8 | — | 30 | 70 | — | 25 | 25 | 50 | 0.5 | NG | 0 |
| Ex. 21 | 1.0 | — | 30 | 70 | — | 50 | 50 | — | 0.5 | OK | 0 |
| Ex. 22 | 1.0 | — | 30 | 70 | — | 30 | 30 | 40 | 0.5 | OK | 0 |
| Com. Ex. 68 | 1.0 | — | 30 | 70 | — | 25 | 25 | 50 | 0.5 | NG | 0 |
| Ex. 23 | 2.0 | — | 30 | 70 | — | 50 | 50 | — | 0.5 | OK | 0 |
| Ex. 24 | 2.0 | — | 30 | 70 | — | 30 | 30 | 40 | 0.5 | OK | 0 |
| Com. Ex. 69 | 2.0 | — | 30 | 70 | — | 25 | 25 | 50 | 0.5 | NG | 0 |
| Com. Ex. 70 | 3.0 | — | 30 | 70 | — | 50 | 50 | — | 0.5 | OK | 2 |
| Com. Ex. 71 | 3.0 | — | 30 | 70 | — | 30 | 30 | 40 | 0.5 | OK | 2 |
| Com. Ex. 72 | 3.0 | — | 30 | 70 | — | 25 | 25 | 50 | 0.5 | NG | 2 |

TABLE 9

| | Monomer mass % | Monomer (mass %) | | | | Solvent (volume %) | | | Succinic anhydride (mass %) | Curability | Capacity |
|---|---|---|---|---|---|---|---|---|---|---|---|
| | | TMPTA | TMMTA | DMAA | MTEGA | EC | PC | DEC | | | |
| Com. Ex. 73 | 0.8 | — | 40 | 60 | — | 50 | 50 | — | 0.5 | NG | 0 |
| Com. Ex. 74 | 0.8 | — | 40 | 60 | — | 30 | 30 | 40 | 0.5 | NG | 0 |
| Com. Ex. 75 | 0.8 | — | 40 | 60 | — | 25 | 25 | 50 | 0.5 | NG | 0 |
| Com. Ex. 76 | 1.0 | — | 40 | 60 | — | 50 | 50 | — | 0.5 | NG | 0 |
| Com. Ex. 77 | 1.0 | — | 40 | 60 | — | 30 | 30 | 40 | 0.5 | NG | 0 |
| Com. Ex. 78 | 1.0 | — | 40 | 60 | — | 25 | 25 | 50 | 0.5 | NG | 0 |
| Com. Ex. 79 | 2.0 | — | 40 | 60 | — | 50 | 50 | — | 0.5 | NG | 0 |
| Com. Ex. 80 | 2.0 | — | 40 | 60 | — | 30 | 30 | 40 | 0.5 | NG | 0 |
| Com. Ex. 81 | 2.0 | — | 40 | 60 | — | 25 | 25 | 50 | 0.5 | NG | 0 |
| Com. Ex. 82 | 3.0 | — | 40 | 60 | — | 50 | 50 | — | 0.5 | NG | 3 |
| Com. Ex. 83 | 3.0 | — | 40 | 60 | — | 30 | 30 | 40 | 0.5 | NG | 2 |
| Com. Ex. 84 | 3.0 | — | 40 | 60 | — | 25 | 25 | 50 | 0.5 | NG | 2 |

TABLE 10

| | Monomer mass % | Monomer (mass %) | | | | Solvent (volume %) | | | Succinic anhydride (mass %) | Curability | Capacity |
|---|---|---|---|---|---|---|---|---|---|---|---|
| | | TMPTA | TMMTA | DMAA | MTEGA | EC | PC | DEC | | | |
| Com. Ex. 85 | 3.0 | 40 | — | — | 60 | 50 | 50 | — | 0.5 | NG | 4 |
| Com. Ex. 86 | 3.0 | 40 | — | — | 60 | 30 | 30 | 40 | 0.5 | NG | 3 |
| Com. Ex. 87 | 3.0 | 40 | — | — | 60 | 25 | 25 | 50 | 0.5 | NG | 3 |
| Com. Ex. 88 | 3.0 | 40 | — | — | 60 | 10 | 10 | 80 | 0.5 | NG | 3 |
| Com. Ex. 89 | 3.0 | 30 | — | — | 70 | 50 | 50 | — | 0.5 | NG | 4 |

TABLE 10-continued

| | Monomer mass % | Monomer (mass %) | | | | Solvent (volume %) | | | Succinic anhydride (mass %) | Curability | Capacity |
|---|---|---|---|---|---|---|---|---|---|---|---|
| | | TMPTA | TMMTA | DMAA | MTEGA | EC | PC | DEC | | | |
| Com. Ex. 90 | 3.0 | 30 | — | — | 70 | 30 | 30 | 40 | 0.5 | NG | 3 |
| Com. Ex. 91 | 3.0 | 30 | — | — | 70 | 25 | 25 | 50 | 0.5 | NG | 3 |
| Com. Ex. 92 | 3.0 | 30 | — | — | 70 | 10 | 10 | 80 | 0.5 | NG | 3 |
| Com. Ex. 93 | 3.0 | 20 | — | — | 80 | 50 | 50 | — | 0.5 | NG | 3 |
| Com. Ex. 94 | 3.0 | 20 | — | — | 80 | 30 | 30 | 40 | 0.5 | NG | 2 |
| Com. Ex. 95 | 3.0 | 20 | — | — | 80 | 25 | 25 | 50 | 0.5 | NG | 2 |
| Com. Ex. 96 | 3.0 | 20 | — | — | 80 | 10 | 10 | 80 | 0.5 | NG | 2 |
| Com. Ex. 97 | 3.0 | 10 | — | — | 90 | 50 | 50 | — | 0.5 | NG | 4 |
| Com. Ex. 98 | 3.0 | 10 | — | — | 90 | 30 | 30 | 40 | 0.5 | NG | 4 |
| Com. Ex. 99 | 3.0 | 10 | — | — | 90 | 25 | 25 | 50 | 0.5 | NG | 3 |
| Com. Ex. 100 | 3.0 | 10 | — | — | 90 | 10 | 10 | 80 | 0.5 | NG | 3 |
| Com. Ex. 101 | 3.0 | — | — | — | 100 | 50 | 50 | — | 0.5 | NG | 3 |
| Com. Ex. 102 | 3.0 | — | — | — | 100 | 30 | 30 | 40 | 0.5 | NG | 3 |
| Com. Ex. 103 | 3.0 | — | — | — | 100 | 25 | 25 | 50 | 0.5 | NG | 3 |
| Com. Ex. 104 | 3.0 | — | — | — | 100 | 10 | 10 | 80 | 0.5 | NG | 3 |

TABLE 11

| | Monomer mass % | Monomer (mass %) | | | | Solvent (volume %) | | | Succinic anhydride (mass %) | Curability | Capacity |
|---|---|---|---|---|---|---|---|---|---|---|---|
| | | TMPTA | TMMTA | DMAA | MTEGA | EC | PC | DEC | | | |
| Com. Ex. 105 | 3.0 | — | 40 | — | 60 | 50 | 50 | — | 0.5 | NG | 3 |
| Com. Ex. 106 | 3.0 | — | 40 | — | 60 | 30 | 30 | 40 | 0.5 | NG | 2 |
| Com. Ex. 107 | 3.0 | — | 40 | — | 60 | 25 | 25 | 50 | 0.5 | NG | 2 |
| Com. Ex. 108 | 3.0 | — | 40 | — | 60 | 10 | 10 | 80 | 0.5 | NG | 2 |
| Com. Ex. 109 | 3.0 | — | 30 | — | 70 | 50 | 50 | — | 0.5 | NG | 3 |
| Com. Ex. 110 | 3.0 | — | 30 | — | 70 | 30 | 30 | 40 | 0.5 | NG | 3 |
| Com. Ex. 111 | 3.0 | — | 30 | — | 70 | 25 | 25 | 50 | 0.5 | NG | 3 |
| Com. Ex. 112 | 3.0 | — | 30 | — | 70 | 10 | 10 | 80 | 0.5 | NG | 3 |
| Com. Ex. 113 | 3.0 | — | 20 | — | 80 | 50 | 50 | — | 0.5 | NG | 4 |

TABLE 11-continued

| | Monomer mass % | Monomer (mass %) | | | | Solvent (volume %) | | | Succinic anhydride (mass %) | Curability | Capacity |
|---|---|---|---|---|---|---|---|---|---|---|---|
| | | TMPTA | TMMTA | DMAA | MTEGA | EC | PC | DEC | | | |
| Com. Ex. 114 | 3.0 | — | 20 | — | 80 | 30 | 30 | 40 | 0.5 | NG | 3 |
| Com. Ex. 115 | 3.0 | — | 20 | — | 80 | 25 | 25 | 50 | 0.5 | NG | 2 |
| Com. Ex. 116 | 3.0 | — | 20 | — | 80 | 10 | 10 | 80 | 0.5 | NG | 2 |
| Com. Ex. 117 | 3.0 | — | 10 | — | 90 | 50 | 50 | — | 0.5 | NG | 3 |
| Com. Ex. 118 | 3.0 | — | 10 | — | 90 | 30 | 30 | 40 | 0.5 | NG | 3 |
| Com. Ex. 119 | 3.0 | — | 10 | — | 90 | 25 | 25 | 50 | 0.5 | NG | 3 |
| Com. Ex. 120 | 3.0 | — | 10 | — | 90 | 10 | 10 | 80 | 0.5 | NG | 3 |

TABLE 12

| | Monomer mass % | Monomer (mass %) | | | | Solvent (volume %) | | | Succinic anhydride (mass %) | Curability | Capacity |
|---|---|---|---|---|---|---|---|---|---|---|---|
| | | TMPTA | TMMTA | DMAA | MTEGA | EC | PC | DEC | | | |
| Com. Ex. 121 | 4.0 | 40 | — | — | 60 | 50 | 50 | — | 0.5 | NG | 6 |
| Com. Ex. 122 | 4.0 | 40 | — | — | 60 | 30 | 30 | 40 | 0.5 | NG | 5 |
| Com. Ex. 123 | 4.0 | 40 | — | — | 60 | 25 | 25 | 50 | 0.5 | NG | 5 |
| Com. Ex. 124 | 4.0 | 40 | — | — | 60 | 10 | 10 | 80 | 0.5 | NG | 5 |
| Com. Ex. 125 | 4.0 | 30 | — | — | 70 | 50 | 50 | — | 0.5 | NG | 6 |
| Com. Ex. 126 | 4.0 | 30 | — | — | 70 | 30 | 30 | 40 | 0.5 | NG | 5 |
| Com. Ex. 127 | 4.0 | 30 | — | — | 70 | 25 | 25 | 50 | 0.5 | NG | 5 |
| Com. Ex. 128 | 4.0 | 30 | — | — | 70 | 10 | 10 | 80 | 0.5 | NG | 5 |
| Com. Ex. 129 | 4.0 | 20 | — | — | 80 | 50 | 50 | — | 0.5 | NG | 6 |
| Com. Ex. 130 | 4.0 | 20 | — | — | 80 | 30 | 30 | 40 | 0.5 | NG | 5 |
| Com. Ex. 131 | 4.0 | 20 | — | — | 80 | 25 | 25 | 50 | 0.5 | NG | 6 |
| Com. Ex. 132 | 4.0 | 20 | — | — | 80 | 10 | 10 | 80 | 0.5 | NG | 5 |
| Com. Ex. 133 | 4.0 | 10 | — | — | 90 | 50 | 50 | — | 0.5 | NG | 5 |
| Com. Ex. 134 | 4.0 | 10 | — | — | 90 | 30 | 30 | 40 | 0.5 | NG | 5 |
| Com. Ex. 135 | 4.0 | 10 | — | — | 90 | 25 | 25 | 50 | 0.5 | NG | 5 |
| Com. Ex. 136 | 4.0 | 10 | — | — | 90 | 10 | 10 | 80 | 0.5 | NG | 5 |
| Com. Ex. 137 | 4.0 | — | — | — | 100 | 50 | 50 | — | 0.5 | NG | 7 |
| Com. Ex. 138 | 4.0 | — | — | — | 100 | 30 | 30 | 40 | 0.5 | NG | 6 |
| Com. Ex. 139 | 4.0 | — | — | — | 100 | 25 | 25 | 50 | 0.5 | NG | 6 |
| Com. Ex. 140 | 4.0 | — | — | — | 100 | 10 | 10 | 80 | 0.5 | NG | 5 |

TABLE 13

| | Monomer mass % | Monomer (mass %) TMPTA | TMMTA | DMAA | MTEGA | Solvent (volume %) EC | PC | DEC | Succinic anhydride (mass %) | Curability | Capacity |
|---|---|---|---|---|---|---|---|---|---|---|---|
| Com. Ex. 141 | 4.0 | — | 40 | — | 60 | 50 | 50 | — | 0.5 | NG | 7 |
| Com. Ex. 142 | 4.0 | — | 40 | — | 60 | 30 | 30 | 40 | 0.5 | NG | 6 |
| Com. Ex. 143 | 4.0 | — | 40 | — | 60 | 25 | 25 | 50 | 0.5 | NG | 6 |
| Com. Ex. 144 | 4.0 | — | 40 | — | 60 | 10 | 10 | 80 | 0.5 | NG | 5 |
| Com. Ex. 145 | 4.0 | — | 30 | — | 70 | 50 | 50 | — | 0.5 | NG | 7 |
| Com. Ex. 146 | 4.0 | — | 30 | — | 70 | 30 | 30 | 40 | 0.5 | NG | 5 |
| Com. Ex. 147 | 4.0 | — | 30 | — | 70 | 25 | 25 | 50 | 0.5 | NG | 5 |
| Com. Ex. 148 | 4.0 | — | 30 | — | 70 | 10 | 10 | 80 | 0.5 | NG | 5 |
| Com. Ex. 149 | 4.0 | — | 20 | — | 80 | 50 | 50 | — | 0.5 | NG | 7 |
| Com. Ex. 150 | 4.0 | — | 20 | — | 80 | 30 | 30 | 40 | 0.5 | NG | 5 |
| Com. Ex. 151 | 4.0 | — | 20 | — | 80 | 25 | 25 | 50 | 0.5 | NG | 5 |
| Com. Ex. 152 | 4.0 | — | 20 | — | 80 | 10 | 10 | 80 | 0.5 | NG | 5 |
| Com. Ex. 153 | 4.0 | — | 10 | — | 90 | 50 | 50 | — | 0.5 | NG | 7 |
| Com. Ex. 154 | 4.0 | — | 10 | — | 90 | 30 | 30 | 40 | 0.5 | NG | 5 |
| Com Ex. 155 | 4.0 | — | 10 | — | 90 | 25 | 25 | 50 | 0.5 | NG | 5 |
| Com. Ex. 156 | 4.0 | — | 10 | — | 90 | 10 | 10 | 80 | 0.5 | NG | 5 |

TABLE 14

| | Monomer mass % | Monomer (mass %) TMMTA | DMAA | Solvent (volume %) EC | PC | DEC | EMC | DMC | Succinic anhydride (mass %) | Curability | Capacity |
|---|---|---|---|---|---|---|---|---|---|---|---|
| Ex. 25 | 1.0 | 20 | 80 | 30 | 30 | — | 40 | — | 0.5 | OK | 0 |
| Ex. 26 | 1.0 | 20 | 80 | 30 | 30 | — | — | 40 | 0.5 | OK | 0 |
| Ex. 27 | 1.0 | 20 | 80 | 45 | 15 | 40 | — | — | 0.5 | OK | 0 |
| Ex. 28 | 1.0 | 20 | 80 | 45 | 15 | — | 40 | — | 0.5 | OK | 0 |
| Ex. 29 | 1.0 | 20 | 80 | 45 | 15 | — | — | 40 | 0.5 | OK | 0 |
| Ex. 30 | 1.0 | 20 | 80 | 60 | — | 40 | — | — | 0.5 | OK | 0 |
| Ex. 31 | 1.0 | 20 | 80 | 60 | — | 40 | — | — | — | OK | 0 |
| Ex. 32 | 1.0 | 20 | 80 | 60 | — | — | 40 | — | 0.5 | OK | 0 |
| Ex. 33 | 1.0 | 20 | 80 | 60 | — | — | 40 | — | — | OK | 0 |
| Ex. 34 | 1.0 | 20 | 80 | 60 | — | — | — | 40 | 0.5 | OK | 0 |
| Ex. 35 | 1.0 | 20 | 80 | 60 | — | — | — | 40 | — | OK | 0 |
| Com. Ex. 157 | 1.0 | 20 | 80 | 25 | 25 | — | 50 | — | 0.5 | NG | 0 |
| Com. Ex. 158 | 1.0 | 20 | 80 | 25 | 25 | — | — | 50 | 0.5 | NG | 0 |
| Com. Ex. 159 | 1.0 | 20 | 80 | 50 | — | 50 | — | — | 0.5 | NG | 0 |
| Com. Ex. 160 | 1.0 | 20 | 80 | 50 | — | — | 50 | — | 0.5 | NG | 0 |
| Com. Ex. 161 | 1.0 | 20 | 80 | 50 | — | — | — | 50 | 0.5 | NG | 0 |

TABLE 15

| | Monomer mass % | Monomer (mass %) TMMTA | DMAA | Solvent (volume %) EC | PC | DEC | EMC | DMC | Succinic anhydride (mass %) | Curability | Capacity |
|---|---|---|---|---|---|---|---|---|---|---|---|
| Ex. 36 | 2.0 | 20 | 80 | 30 | 30 | — | 40 | — | 0.5 | OK | 0 |
| Ex. 37 | 2.0 | 20 | 80 | 30 | 30 | — | — | 40 | 0.5 | OK | 0 |
| Ex. 38 | 2.0 | 20 | 80 | 45 | 15 | 40 | — | — | 0.5 | OK | 0 |
| Ex. 39 | 2.0 | 20 | 80 | 45 | 15 | — | 40 | — | 0.5 | OK | 0 |
| Ex. 40 | 2.0 | 20 | 80 | 45 | 15 | — | — | 40 | 0.5 | OK | 0 |
| Ex. 41 | 2.0 | 20 | 80 | 60 | — | 40 | — | — | 0.5 | OK | 0 |
| Ex. 42 | 2.0 | 20 | 80 | 60 | — | 40 | — | — | — | OK | 0 |
| Ex. 43 | 2.0 | 20 | 80 | 60 | — | — | 40 | — | 0.5 | OK | 0 |
| Ex. 44 | 2.0 | 20 | 80 | 60 | — | — | 40 | — | — | OK | 0 |
| Ex. 45 | 2.0 | 20 | 80 | 60 | — | — | — | 40 | 0.5 | OK | 0 |
| Ex. 46 | 2.0 | 20 | 80 | 60 | — | — | — | 40 | — | OK | 0 |
| Com. Ex. 162 | 2.0 | 20 | 80 | 25 | 25 | — | 50 | — | 0.5 | NG | 0 |
| Com. Ex. 163 | 2.0 | 20 | 80 | 25 | 25 | — | — | 50 | 0.5 | NG | 0 |
| Com. Ex. 164 | 2.0 | 20 | 80 | 50 | — | 50 | — | — | 0.5 | NG | 0 |
| Com. Ex. 165 | 2.0 | 20 | 80 | 50 | — | — | 50 | — | 0.5 | NG | 0 |
| Com. Ex. 166 | 2.0 | 20 | 80 | 50 | — | — | — | 50 | 0.5 | NG | 0 |

Table 1 shows that in examples 1 to 4, where the monomer was from 1.0 to 2.0 mass % and the combined volume ratio (25° C., 1 atm) of the ethylene carbonate (EC) and propylene carbonate (PC) was from 60 to 100%, the polymer was cured sufficiently and a preferable discharge characteristic was obtained. Contrarily, in comparative examples 1 to 3, where the monomer was 0.8 mass %, and in comparative examples 4 and 5, where the combined volume ratio (25° C., 1 atm) of EC and PC was 50%, the discharge characteristic was preferable but the polymer was not cured sufficiently. In comparative examples 6 to 8, where the monomer was 3.0 mass %, the polymer was cured sufficiently but the discharge characteristic was not sufficient.

Here is a possible explanation for the results. In examples 1 to 4, the solvent held by the formed polymer has a high volume ratio for the highly viscous ethylene carbonate (EC) and propylene carbonate (PC), and contains a sufficient amount of the polymer for curing the polymer. This realized the above preferable performance. If the amount of the polymer is excessively small or the viscosity of the solvent is small, the polymer is not cured sufficiently. If the amount of the polymer is excessively large, the formed cross-linked polymer undermines ion conductivity for the lithium ions, thereby adversely affecting the discharge characteristic.

Tables 1 to 5 show that when the trimethylolpropane triacrylate (TMPTA, a compound with three acrylates) constitute from 10 to 30 mass % of the total monomer while meeting the preferable conditions, then the polymer is cured sufficiently and a preferable discharge characteristic is obtained. When the trimethylolpropane triacrylate (TMPTA) is 0 mass %, the curability is insufficient, while when the trimethylolpropane triacrylate (TMPTA) is 40 mass % the curability is insufficient in some cases and the discharge characteristic is poor in other cases.

While what caused the results is not definitely understood, a possible explanation is such that a preferable polymer network is formed when the trimethylolpropane triacrylate (TMPTA) is from 10 to 30 mass % and the N,N-dimethyl acrylamide (DMAA) is from 70 to 90 mass %.

Tables 1 to 9 show that similar advantageous effects are obtained when tetramethylolmethane tetraacrylate (TMMTA, a compound with four acrylates) is used instead of the trimethylolpropane triacrylate (TMPTA).

Tables 10 to 13 show that when methoxytriethyleneglycol acrylate (METGA, a compound with one acrylate) is used instead of the N,N-dimethyl acrylamide (DMAA), the polymer is not cured sufficiently in the case of the monomer at 3.0 mass % but cured in the case of 4.0 mass % though with a poor discharge characteristic in either case. A possible explanation is such that because the N,N-dimethyl acrylamide (DMAA) is not used, a preferable polymer network is not formed, and that because the amount of the monomer is excessively large, the cross-linked hinders conductivity for the lithium ions, thereby adversely affecting the discharge characteristic.

Tables 14 and 15 show that when ethyl methyl carbonate (EMC) or dimethyl carbonate (DMC) is used instead of diethyl carbonate (DEC), preferable performance is obtained insofar as the combined volume ratio (25° C., 1 atm) of the ethylene carbonate (EC) and propylene carbonate (PC) is equal to or more than 60 mass %.

Examples 30 to 35 and 41 to 46 show that addition of the succinic anhydride does not adversely affect the cells. Since the succinic anhydride has the effect of inhibiting the decomposition of the propylene carbonate (PC) at the negative electrode, the succinic anhydride is preferably contained in the non-aqueous solvent when the propylene carbonate is contained.

While a mixture of the N,N-dimethyl acrylamide (DMAA) and the methoxytriethyleneglycol acrylate (METGA) was not subjected to the test, the mixture will presumably not provide preferable properties, from comparative examples 37 to 48, where the N,N-dimethyl acrylamide (DMAA) was used alone, and comparative examples 101 to 104 and 137 to 140, where the methoxytriethyleneglycol acrylate (METGA) was used alone.

Thus, the polymer preferably contains a mixture of N,N-dimethyl acrylamide and a compound with three or more acrylate groups and/or methacrylate groups at a mass ratio of from 90:10 to 70:30, the ratio of the polymer to the polymer electrolyte is preferably from 1.0 to 2.0 mass %, the non-aqueous solvent preferably contains at least one of ethylene carbonate (EC) and propylene carbonate (PC), and the volume ratio (25° C., 1 atm) of the ethylene carbonate and the propylene carbonate combined to the non-aqueous solvent is preferably equal to or more than 60%.

Embodiment 2

An embodiment according to the second aspect of the present invention will be described below. This embodiment is the same as embodiment 1 except that the polymer electrolyte contains tertiary vinyl carboxylate (e.g., vinyl pivalate). The method for preparation of this embodiment is as described in Embodiment 1 except for that of the prepolymer electrolyte, and therefore description thereof will not be repeated herein.

<Preparation of the Prepolymer Electrolyte>

In a mixture solvent of ethylene carbonate (EC), propylene carbonate (PC), diethyl carbonate (DEC), ethyl methyl carbonate (EMC), and dimethyl carbonate (DMC), $LiPF_6$ as the electrolyte salt was dissolved at a rate of 1.1 (mol/liter), thus obtaining an electrolytic solution. To this electrolytic solution, 0.5 mass [parts] % of succinic anhydride was added.

To this mixture solution were added: trimethylolpropane triacrylate (TMPTA) represented by Formula 15; tetramethylolmethane tetraacrylate (TMMTA) represented by Formula 16; N,N-dimethyl acrylamide (DMAA) represented by Formula 17; vinyl pivalate (compound A) represented by Formula 18; vinyl butyrate (compound X1) represented by Formula 19; vinyl propionate (compound X2) represented by Formula 20; vinyl acetate (compound X3) represented by Formula 21; and 3000 ppm of tert-butyl peroxypivalate as a polymerization initiator. Thus a prepolymer electrolyte was obtained.

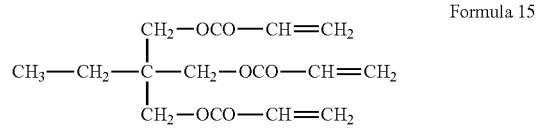

Formula 15

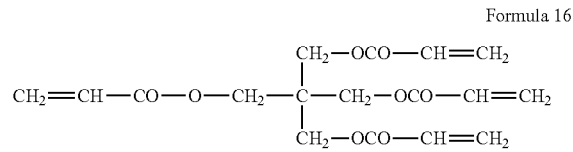

Formula 16

$$CH_2=CH-CO-N(CH_3)_2 \qquad \text{Formula 17}$$

$$C(CH_3)_3-CO-O-CH=CH_2 \qquad \text{Formula 18}$$

$$CH(CH_3)_2-CO-CH=CH_2 \qquad \text{Formula 19}$$

$$CH_2(CH_3)-CO-CH=CH_2 \qquad \text{Formula 20}$$

$$CH_3-CO-CH=CH_2 \qquad \text{Formula 21}$$

(Second Example Group)

Cells according to examples 47 to 102 and comparative examples 167 to 170 were prepared in the same manner as in embodiment 2. Tables 16 to 23 below list, for each of the examples, the kind of the non-aqueous solvent and its volume ratio (25° C., 1 atm), the mass ratio of the monomer (which is defined as the mass ratio of the monomer to the monomer, solvent, electrolytic salt, and succinic anhydride, which are assumed to be 100 mass parts, which ratio is taken as the polymer mass ratio), and the mass percentage of the succinic anhydride (which is defined as the mass ratio of the succinic anhydride to the monomer, solvent, electrolytic salt, and succinic anhydride, which are assumed to be 100 mass parts).

The cells according to examples 47 to 102 and comparative examples 167 to 170 were subjected to estimation of polymer curability and measurement of capacity, similarly to the first example group. The results are shown in Tables 16 to 23. In the capacity measurement, the case where any one of the ten cells was found to be NG was estimated as NG, while the case where no NG was found was estimated as OK.

[Overcharge Test]

The cells according to examples 47 to 102 and comparative examples 167 to 170 were charged at a constant current of 3 It (2400 mA) to a voltage of 12 V. The case resulting in smoking or fire was estimated as NG, while the case where no smoking or fire was observed was estimated as OK.

TABLE 16

| | Monomer mass % | Monomer (mass %) | | | | Solvent (volume %) | | | Succinic anhydride (mass %) | Curability | Capacity | Overcharge characteristic |
| | | TMPTA | TMMTA | DMAA | Compound A | EC | PC | DEC | | | | |
|---|---|---|---|---|---|---|---|---|---|---|---|---|
| Com. Ex. 167 | 0.8 | 30 | — | 60 | 10 | 50 | 50 | — | 0.5 | NG | OK | OK |
| Ex. 47 | 1.0 | 30 | — | 60 | 10 | 50 | 50 | — | 0.5 | OK | OK | OK |
| Ex. 48 | 1.0 | 30 | — | 60 | 10 | 50 | 50 | — | 0.5 | OK | OK | OK |
| Com. Ex. 168 | 3.0 | 30 | — | 60 | 10 | 50 | 50 | — | 0.5 | OK | NG | OK |
| Com. Ex. 169 | 2.0 | — | 5 | 85 | 10 | 50 | 50 | — | 0.5 | NG | OK | OK |
| Com. Ex. 170 | 2.0 | 40 | — | 50 | 10 | 50 | 50 | — | 0.5 | NG | OK | OK |

TABLE 17

| | Monomer mass % | Monomer (mass %) | | | | Solvent (volume %) | | | Succinic anhydride (mass %) | Curability | Capacity | Overcharge characteristic |
|---|---|---|---|---|---|---|---|---|---|---|---|---|
| | | TMPTA | TMMTA | DMAA | Compound A | EC | PC | DEC | | | | |
| Ex. 49 | 1.0 | 30 | — | 70 | — | 50 | 50 | — | 0.5 | OK | OK | NG |
| Ex. 50 | 1.0 | 30 | — | 60 | 10 | 50 | 50 | — | 0.5 | OK | OK | OK |
| Ex. 51 | 1.0 | 30 | — | 70 | — | 30 | 30 | 40 | 0.5 | OK | OK | NG |
| Ex. 52 | 1.0 | 30 | — | 60 | 10 | 30 | 30 | 40 | 0.5 | OK | OK | OK |
| Ex. 53 | 1.0 | 30 | — | 20 | 50 | 30 | 30 | 40 | 0.5 | OK | OK | OK |
| Ex. 54 | 1.0 | 30 | — | 10 | 60 | 30 | 30 | 40 | 0.5 | NG | OK | OK |
| Ex. 55 | 1.0 | — | 30 | 60 | — | 50 | 50 | — | 0.5 | OK | OK | NG |
| Ex. 56 | 1.0 | — | 30 | 60 | 10 | 50 | 50 | — | 0.5 | OK | OK | OK |
| Ex. 57 | 1.0 | — | 30 | 70 | — | 30 | 30 | 40 | 0.5 | OK | OK | NG |
| Ex. 58 | 1.0 | — | 30 | 60 | 10 | 30 | 30 | 40 | 0.5 | OK | OK | OK |
| Ex. 59 | 1.0 | — | 30 | 20 | 50 | 30 | 30 | 40 | 0.5 | OK | OK | OK |
| Ex. 60 | 1.0 | — | 30 | 10 | 60 | 30 | 30 | 40 | 0.5 | NG | OK | OK |

TABLE 18

| | Monomer mass % | Monomer (mass %) | | | | Solvent (volume %) | | | Succinic anhydride (mass %) | Curability | Capacity | Overcharge characteristic |
|---|---|---|---|---|---|---|---|---|---|---|---|---|
| | | TMPTA | TMMTA | DMAA | Compound A | EC | PC | DEC | | | | |
| Ex. 61 | 2.0 | 30 | — | 70 | — | 50 | 50 | — | 0.5 | OK | OK | NG |
| Ex. 62 | 2.0 | 30 | — | 60 | 10 | 50 | 50 | — | 0.5 | OK | OK | OK |
| Ex. 63 | 2.0 | 30 | — | 70 | — | 30 | 30 | 40 | 0.5 | OK | OK | NG |
| Ex. 64 | 2.0 | 30 | — | 60 | 10 | 30 | 30 | 40 | 0.5 | OK | OK | OK |
| Ex. 65 | 2.0 | 30 | — | 20 | 50 | 30 | 30 | 40 | 0.5 | OK | OK | OK |
| Ex. 66 | 2.0 | 30 | — | 10 | 60 | 30 | 30 | 40 | 0.5 | NG | OK | OK |
| Ex. 67 | 2.0 | — | 30 | 60 | — | 50 | 50 | — | 0.5 | OK | OK | NG |
| Ex. 68 | 2.0 | — | 30 | 60 | 10 | 50 | 50 | — | 0.5 | OK | OK | OK |
| Ex. 69 | 2.0 | — | 30 | 70 | — | 30 | 30 | 40 | 0.5 | OK | OK | NG |
| Ex. 70 | 2.0 | — | 30 | 60 | 10 | 30 | 30 | 40 | 0.5 | OK | OK | OK |
| Ex. 71 | 2.0 | — | 30 | 20 | 50 | 30 | 30 | 40 | 0.5 | OK | OK | OK |
| Ex. 72 | 2.0 | — | 30 | 10 | 60 | 30 | 30 | 40 | 0.5 | NG | OK | OK |

TABLE 19

| | Monomer mass % | Monomer (mass %) | | | | Solvent (volume %) | | | Succinic anhydride (mass %) | Curability | Capacity | Overcharge characteristic |
|---|---|---|---|---|---|---|---|---|---|---|---|---|
| | | TMPTA | TMMTA | DMAA | Compound A | EC | PC | EMC | | | | |
| Ex. 73 | 2.0 | — | 30 | 70 | — | 30 | 30 | 40 | 0.5 | OK | OK | NG |
| Ex. 74 | 2.0 | — | 30 | 60 | 10 | 30 | 30 | 40 | 0.5 | OK | OK | OK |
| Ex. 75 | 2.0 | — | 30 | 20 | 50 | 30 | 30 | 40 | 0.5 | OK | OK | OK |
| Ex. 76 | 2.0 | — | 30 | 10 | 60 | 30 | 30 | 40 | 0.5 | NG | OK | OK |

TABLE 20

| | Monomer mass % | Monomer (mass %) | | | | Solvent (volume %) | | | Succinic anhydride (mass %) | Curability | Capacity | Overcharge characteristic |
|---|---|---|---|---|---|---|---|---|---|---|---|---|
| | | TMPTA | TMMTA | DMAA | Compound A | EC | PC | DMC | | | | |
| Ex. 77 | 2.0 | — | 30 | 70 | — | 30 | 30 | 40 | 0.5 | OK | OK | NG |
| Ex. 78 | 2.0 | — | 30 | 60 | 10 | 30 | 30 | 40 | 0.5 | OK | OK | OK |
| Ex. 79 | 2.0 | — | 30 | 20 | 50 | 30 | 30 | 40 | 0.5 | OK | OK | OK |
| Ex. 80 | 2.0 | — | 30 | 10 | 60 | 30 | 30 | 40 | 0.5 | NG | OK | OK |

TABLE 21

| | Monomer mass % | Monomer (mass %) | | | | Solvent (volume %) | | | Succinic anhydride (mass %) | Curability | Capacity | Overcharge characteristic |
|---|---|---|---|---|---|---|---|---|---|---|---|---|
| | | TMPTA | TMMTA | DMAA | Compound A | EC | PC | DMC | | | | |
| Ex. 81 | 2.0 | — | 30 | 70 | — | 40 | — | 60 | 0.5 | OK | OK | NG |
| Ex. 82 | 2.0 | — | 30 | 60 | 10 | 40 | — | 60 | 0.5 | OK | OK | OK |
| Ex. 83 | 2.0 | — | 30 | 20 | 50 | 40 | — | 60 | 0.5 | OK | OK | OK |
| Ex. 84 | 2.0 | — | 30 | 10 | 60 | 40 | — | 60 | 0.5 | NG | OK | OK |

TABLE 22

| | Monomer mass % | Monomer (mass %) | | | | Solvent (volume %) | | | Succinic anhydride (mass %) | Curability | Capacity | Overcharge characteristic |
|---|---|---|---|---|---|---|---|---|---|---|---|---|
| | | TMPTA | TMMTA | DMAA | Compound A | EC | PC | DEC | | | | |
| Ex. 85 | 2.0 | — | 10 | 90 | — | 50 | 50 | — | 0.5 | OK | OK | NG |
| Ex. 86 | 2.0 | — | 10 | 80 | 10 | 50 | 50 | — | 0.5 | OK | OK | OK |
| Ex. 87 | 2.0 | — | 10 | 90 | — | 30 | 30 | 40 | 0.5 | OK | OK | NG |
| Ex. 88 | 2.0 | — | 10 | 80 | 10 | 30 | 30 | 40 | 0.5 | OK | OK | OK |
| Ex. 89 | 2.0 | — | 10 | 40 | 50 | 30 | 30 | 40 | 0.5 | OK | OK | OK |
| Ex. 90 | 2.0 | — | 10 | 30 | 60 | 30 | 30 | 40 | 0.5 | NG | OK | OK |

TABLE 23

| | Monomer mass % | Monomer (mass %) | | | | | | Solvent (volume %) | | | Succinic anhydride (mass %) | Curability | Capacity | Overcharge characteristic |
|---|---|---|---|---|---|---|---|---|---|---|---|---|---|---|
| | | TMMTA | DMAA | Compound A | Compound X1 | Compound X2 | Compound X3 | EC | PC | DEC | | | | |
| Ex. 91 | 2.0 | 30 | 60 | — | 10 | — | — | 50 | 50 | — | 0.5 | OK | OK | NG |
| Ex. 92 | 2.0 | 30 | 60 | — | 10 | — | — | 30 | 30 | 40 | 0.5 | OK | OK | NG |
| Ex. 93 | 2.0 | 30 | 20 | — | 50 | — | — | 30 | 30 | 40 | 0.5 | OK | OK | NG |
| Ex. 94 | 2.0 | 30 | 10 | — | 60 | — | — | 30 | 30 | 40 | 0.5 | NG | OK | NG |
| Ex. 95 | 2.0 | 30 | 60 | — | — | 10 | — | 50 | 50 | — | 0.5 | OK | OK | NG |
| Ex. 96 | 2.0 | 30 | 60 | — | — | 10 | — | 30 | 30 | 40 | 0.5 | OK | OK | NG |
| Ex. 97 | 2.0 | 30 | 20 | — | — | 50 | — | 30 | 30 | 40 | 0.5 | OK | OK | NG |
| Ex. 98 | 2.0 | 30 | 10 | — | — | 60 | — | 30 | 30 | 40 | 0.5 | NG | OK | NG |
| Ex. 99 | 2.0 | 30 | 60 | — | — | — | 10 | 50 | 50 | — | 0.5 | OK | OK | NG |
| Ex. 100 | 2.0 | 30 | 60 | — | — | — | 10 | 30 | 30 | 40 | 0.5 | OK | OK | NG |
| Ex. 101 | 2.0 | 30 | 20 | — | — | — | 50 | 30 | 30 | 40 | 0.5 | OK | OK | NG |
| Ex. 102 | 2.0 | 30 | 10 | — | — | — | 60 | 30 | 30 | 40 | 0.5 | NG | OK | NG |

Table 16 shows that in the case of the monomer containing the vinyl pivalate (compound A), the cell of comparative example 167, which contains the monomer at 0.8 mass %, has a preferable discharge characteristic but with insufficient polymer curability, and comparative example 168, which contains the monomer at 3.0 mass %, has sufficient polymer curability but with an insufficient discharge characteristic. Contrarily, examples 47 and 48, which contain the monomer at from 1.0 to 2.0 mass %, have a sufficiently cured monomer and a preferable discharge characteristic at the same time.

Table 16 also shows that when the trimethylolpropane triacrylate (TMPTA, a compound with three acrylates) constitutes less than 10 mass % or more than 30 mass % of the total monomer, the polymer is not cured sufficiently (see comparative examples 169 and 170).

This is believed to be because of the same reason as the one provided for the first example group.

Table 17 shows that examples 49, 51, 55, and 57, which contain no vinyl pivalate, have preferable polymer curability and discharge characteristic but with insufficient security during cell overcharge. Contrarily, examples 50, 52 to 54, 56, and 58 to 60, which contain the vinyl pivalate, excel in security during cell overcharge.

A possible explanation is such that the vinyl pivalate reacts with the negative electrode to form a high-quality coating that inhibits the negative electrode from reacting with the polymer electrolyte, thereby enhancing security in case of cell overcharge.

Table 17 also shows that examples 54 and 60, in which the vinyl pivalate constitutes 60 mass % of the total monomer, have a preferable discharge characteristic but with insufficient polymer curability.

While what caused the result is not definitely understood, a possible explanation is such that if the amount of the vinyl pivalate is excessively large, a preferable polymer network cannot be formed.

Table 18 shows that examples 61, 63, 67, and 69, which contain no vinyl pivalate, have preferable polymer curability and discharge characteristic but with insufficient, security during cell overcharge. Contrarily, examples 62, 64 to 66, 68, and 70 to 72, which contain the vinyl pivalate, excel in polymer curability, discharge characteristic, and security during cell overcharge.

This is believed to be because of the same reason as the one provided above.

Table 18 also shows that examples 66 and 72, in which the vinyl pivalate constitutes 60 mass % of the total monomer, have a preferable discharge characteristic but with insufficient polymer curability.

This is believed to be because of the same reason as the one provided above.

Tables 18 to 20 show that the case of using, as solvent components in addition to the ethylene carbonate (EC) and propylene carbonate (PC), diethyl carbonate (DEC), ethyl methyl carbonate (EMC), or dimethyl carbonate (DMC) provides similar advantageous effects (see examples 69 to 80).

Table 21 shows that the case of using a mixture solvent of the ethylene carbonate (EC) and diethyl carbonate (DEC) provides similar advantageous effects (see examples 81 to 84).

Table 22 shows that in examples 85 and 87, where no vinyl pivalate is contained, security during cell overcharge is estimated as NG. Contrarily, examples 86 and 88 to 90, which contain the vinyl pivalate content at from 10 to 60 mass %, have preferable security during cell overcharge.

This is believed to be because of the same reason as the one provided above.

Table 22 also shows that examples 86, 88, and 89, which contain the vinyl pivalate at from 10 to 50 mass %, have preferable polymer curability. Contrarily, example 90, which contains the vinyl pivalate at 60 mass % has poor polymer curability.

A possible explanation is such that if the amount of the vinyl pivalate is excessively large, a preferable polymer network cannot be formed-Table 23 shows that in examples 91 to 102, which use secondary vinyl carboxylate (compounds X1 to X3) instead of the tertiary vinyl carboxylate, i.e., the vinyl pivalate, security during cell overcharge is estimated as NG.

Here is a possible explanation. When the monomer contains the tertiary vinyl carboxylate, the tertiary vinyl carboxylate reacts with the negative electrode to form a preferable coating, thereby enhancing security during cell overcharge. Since the secondary vinyl carboxylate has no such advantageous effect, security during cell overcharge cannot be enhanced.

(Supplementary Remarks)

To the mixture solvent of ethylene carbonate and propylene carbonate, a non-aqueous solvent of carbonate, lactone, ketone, ether, ester, or the like may be added. Specifically, in addition to the solvents used in the above examples, butylene carbonate, dimethyl carbonate, γ-butyrolactone, γ-valerolactone, γ-dimethoxyethane, tetrahydrofuran, 1,4-dioxane, and the like may be used. In view of improving the discharge characteristic, chain carbonate is preferred.

As the electrolytic salt, instead of $LiPF_6$, for example, $LiBF_4$, $LiCF3SO_3$, $LiAsF_6$, $LiN(CF_3SO_2)_2$, $LiN(C_2F_5SO_2)_2$, $LiClO_4$, or the like may be used alone or in combination of equal to or more than two of the foregoing. The amount of the electrolytic salt dissolved in the non-aqueous solvent is preferably from 0.5 to 2.0 mol/liter.

As the positive electrode active material, in place of the above-described lithium cobalt oxide ($Li_xCoO_2$, $0<x\leq1.1$), lithium nickel oxide ($Li_xNiO_2$, $0<x\leq1.1$), lithium manganese oxide ($Li_xMnO_2$, $0<x\leq1.1$; $Li_xMn_2O_4$, $0<x\leq1.1$), or compound in which any of the foregoing transition metal elements is substituted with another element (e.g., $Li_xCo_yNi_{1-y}O_2$, $0<x\leq1.1$; $Li_xCo_yNi_zMn_{1-y-z}$, $O_2$, $0<x\leq1.1$) may be used alone or in combination of two or more of the foregoing.

As the negative electrode material, instead of graphite, a carbonaceous matter (e.g., acetylene black, carbon black, and non-crystalline carbon) capable of intercalating and disintercalating lithium ions, a silicon matter, metal lithium, lithium alloy, and a metal oxide capable of intercalating and disintercalating lithium ions may be used alone or in combination of two or more of the foregoing.

As has been described hereinbefore, according to the present invention, a polymer electrolyte with superior performance for holding the electrolytic solution, conductivity, and security during cell overcharge is formed, thereby providing a safe polymer electrolyte secondary cell with high capacity and a superior cycle characteristic. Thus, industrial applicability is considerable.

What is claimed is:

1. A polymer gel electrolyte secondary cell comprising:
   a positive electrode;
   a negative electrode;
   a polymer gel electrolyte containing
      a non-aqueous solvent,
      a polymer, and
      a lithium salt; and
   a cell case for accommodating the positive electrode, the negative electrode, and the polymer gel electrolyte,
   wherein:
   the non-aqueous solvent contains at least one of ethylene carbonate and propylene carbonate, the volume ratio (25° C., 1 atm) of the ethylene carbonate and the propylene carbonate combined to the non-aqueous solvent being equal to or more than 60%;
   the polymer comprises a copolymer having a monomer containing N,N-dimethyl acrylamide and a compound with three or more acrylate groups and/or methacrylate groups, the ratio of the compound to the total mass of the monomer being from 10 to 30 mass %; and
   the ratio of the polymer to the polymer gel electrolyte including the polymer is from 1.0 to 2.0 mass %.

2. The polymer gel electrolyte secondary cell according to claim 1, wherein:
   the non-aqueous solvent contains propylene carbonate; and
   the polymer gel electrolyte further contains succinic anhydride.

3. The polymer gel electrolyte secondary cell according to claim 1, wherein the polymer is formed by polymerization of the monomer in the cell.

4. The polymer gel electrolyte secondary cell according to claim 1, wherein the cell case is made of an aluminum laminate film.

5. The polymer gel electrolyte secondary cell according to claim 1, wherein the polymer comprises a copolymer having a monomer further containing tertiary vinyl carboxylate in addition to N,N-dimethyl acrylamide and a compound with three or more acrylate groups and/or methacrylate groups, the ratio of the compound to the total mass of the monomer being from 10 to 30 mass %.

6. The polymer gel electrolyte secondary cell according to claim 5, wherein the tertiary vinyl carboxylate is vinyl pivalate.

7. The polymer gel electrolyte secondary cell according to claim 5, wherein the mass ratio of the tertiary vinyl carboxylate to the total mass of the monomer is from 10 to 50%.

8. The polymer gel electrolyte secondary cell according to claim 5, wherein:
   the non-aqueous solvent contains propylene carbonate; and the polymer gel electrolyte further contains succinic anhydride.

9. The polymer gel electrolyte secondary cell according to claim 5, wherein the polymer is formed by polymerization of the monomer in the cell.

10. The polymer gel electrolyte secondary cell according to claim 5, wherein the cell case is made of an aluminum laminate film.

11. The polymer gel electrolyte secondary cell according to claim 7, wherein the tertiary vinyl carboxylate is vinyl pivalate.

12. The polymer gel electrolyte secondary cell according to claim 7, wherein:
  the non-aqueous solvent contains propylene carbonate; and
  the polymer-gel electrolyte further contains succinic anhydride.

13. The polymer gel electrolyte secondary cell according to claim 7, wherein the polymer is formed by polymerization of the monomer in the cell.

14. The polymer gel electrolyte secondary cell according to claim 7, wherein the cell case is made of an aluminum laminate film.

* * * * *